B. W. BRONANDER.
VARIABLE SPEED DRIVING GEAR.
APPLICATION FILED JULY 2, 1913.
1,135,990.
Patented Apr. 20, 1915.
2 SHEETS—SHEET 1.
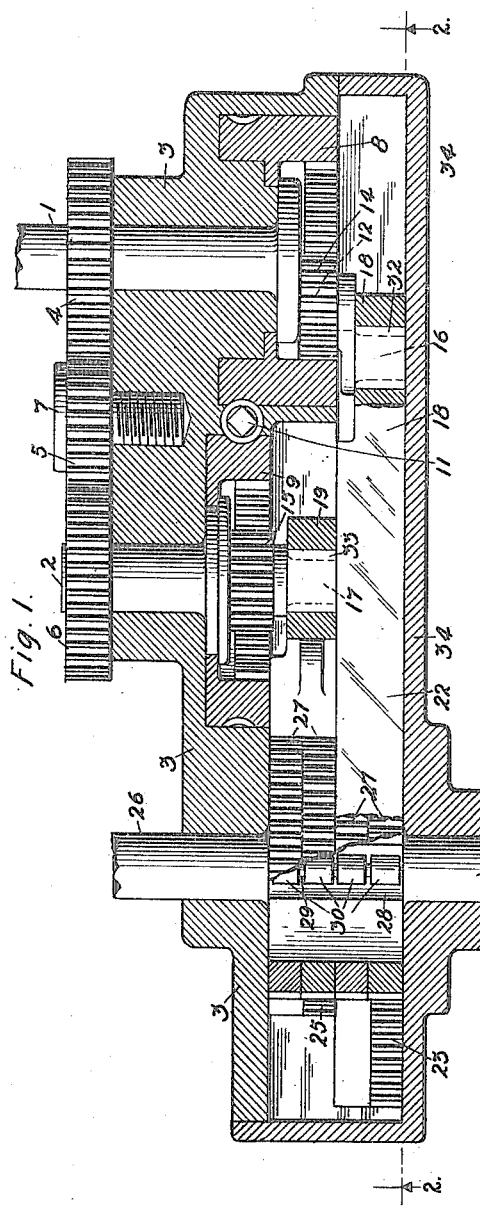
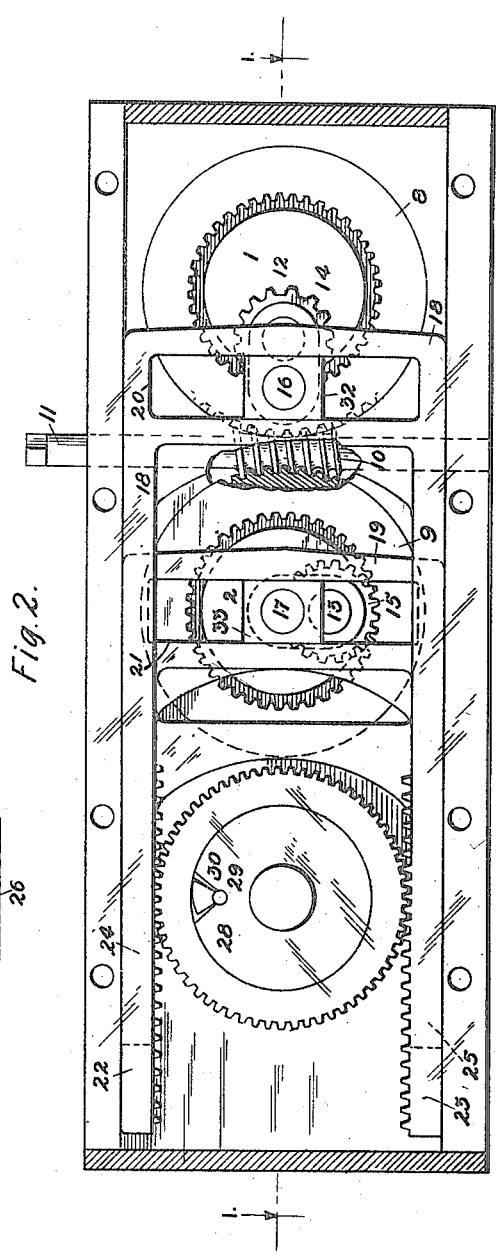
Witnesses:
Inventor:

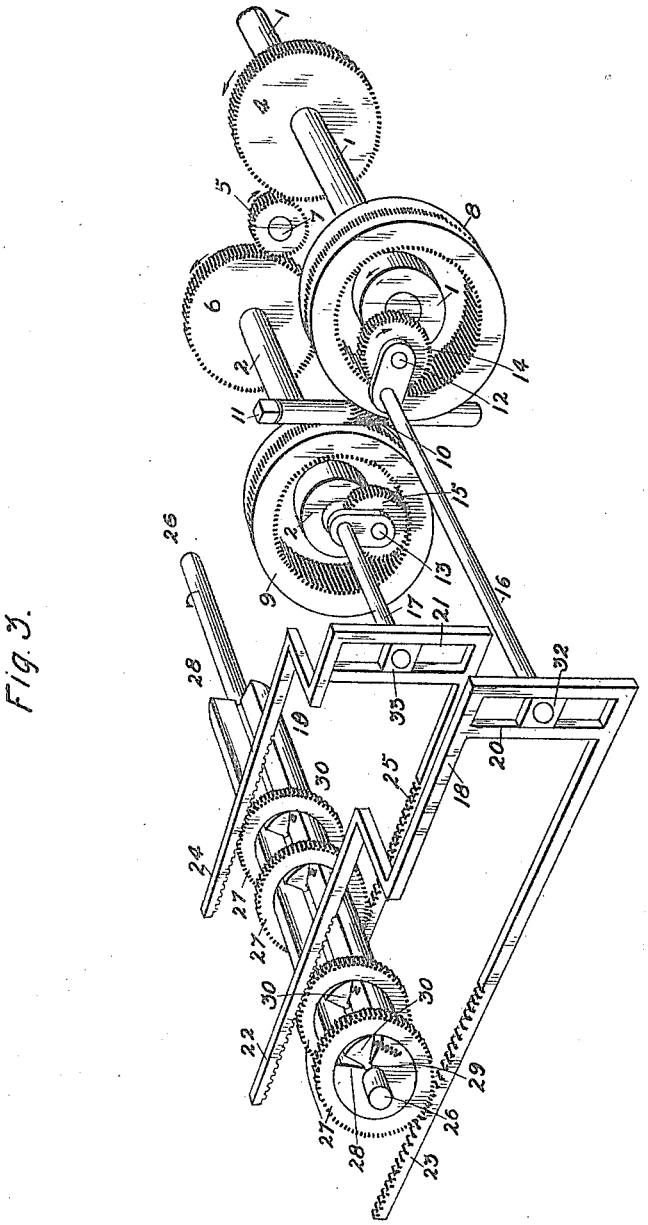

UNITED STATES PATENT OFFICE.

BERTIL W. BRONANDER, OF NEW YORK, N. Y.

VARIABLE-SPEED DRIVING-GEAR.

1,135,990.          Specification of Letters Patent.      Patented Apr. 20, 1915.

Application filed July 2, 1913. Serial No. 776,932.

*To all whom it may concern:*

Be it known that I, BERTIL W. BRONANDER, a subject of the King of Sweden, residing in New York city, borough of Brooklyn, in the county of Kings and State of New York, have invented new and useful Improvements in Variable-Speed Driving-Gear, of which the following is a specification.

My invention relates to transmitting the rotary motion of a driving shaft to a driven shaft and adjusting the rate of rotation of the driven shaft while the driving shaft is rotating at a constant speed and the object is to provide a practical device for propelling a motor driven vehicle such as an automobile and varying the speed of movement without changing the connection or speed of movement of the motor.

The accompanying drawings illustrate the invention.

Figure 1 is a transverse section on the line 1—1, Fig. 2, and Fig. 2 is an elevation on the line 2—2, Fig. 1. Fig. 3 is a schematic view showing the parts in their operative relation and so spaced or separated as to render the relation more clearly apparent.

Crank shafts 1 and 2 rotate in bearings fixed in housing 3, said crank shafts are connected through gears 4, 5, 6; gears 4 and 6 are of equal pitch-diameter and same diametral-pitch. Gear 4 is mounted on crank shaft 1 and gear 6 on crank shaft 2. Intermediate gear 5 is on a stud 7. Internal gear 8 is central with crank shaft 1 and internal gear 9 is central with crank shaft 2; gears 8 and 9 have on their external face teeth cut like a worm-wheel and are connected through worm 10, mounted on shaft 11, by means of which shaft they may be turned together. The internal pitch-diameter of internal gears 8 and 9 is the same in both cases; the external pitch-diameter, or the pitch-diameter of the worm-wheel on 8, is the same as on 9. The distance from the center of crank-shaft 1 to the center of crank-pin 12, is one-fourth the internal pitch-diameter of internal gear 8. The distance from center of crank-shaft to center of crank-pin is the same in regard to both 1 and 2. Crank-gears 14 and 15 are of equal dimensions and same diametral pitch. The pitch diameter of crank-gear 14 is equal to one-half the internal pitch-diameter of internal gear 8. Crank gear 14 and internal gear 8 have the same diametral pitch. The distance from center of crank-gear 14 to center of crank-pin 16 is one-half the pitch-diameter of crank-gear 14 and is equal to the distance from center of crank-shaft 1 to the center of crank-pin 12, previously described. Crank-gear 14 rotates on crank-pin 12 and is in mesh with internal gear 8. Crank-gear 15 rotates on crank-pin 13 and crank-gear 15 is in mesh with internal gear 9.

With a given rotation of crank-shaft 1, driven by any suitable power, crank gear 14 will rotate in an opposite direction to crank-shaft 1. When crank-gear 14 is caused to rotate inside internal gear 8 crank-pin 16, connected to crank-gear 14, will have a reciprocating motion with a stroke equal to twice the pitch diameter of crank-gear 14. Crank-shaft 2, connected to crank-shaft 1, through gear 5, rotates in the same direction and with the same velocity as crank-shaft 1. Crank-gear 15 carried by crank-pin 13 on crank-shaft 2 and in mesh with internal gear 9, will rotate in the opposite direction to crank-shaft 2. When crank-gear 15, driven by crank-shaft 2, rotates inside internal gear 9, crank-pin 17 will have a reciprocating motion equal to that of crank-pin 16 on crank-gear 14.

Slides 18 and 19 reciprocate in housing 3; each has at one end a slot or cross-slideway 20, 21, each slide 18, 19, has two arms or gear-racks, shown at 22 and 23 on slide 18 and at 24, 25, on slide 19. On said gear-racks on slide 18 the teeth are cut so that the teeth of gear-rack 22 are in one plane and the teeth of gear-rack 23 in a separated, parallel plane, so that each may be arranged to mesh with a separate gear. The driven shaft 26 rotates in bearings in housing 3 and in cover 34. The driven shaft 26 carries four driving gears 27; each of said driving gears are connected with driven shaft 26 by rocker devices whereby each gear clutches driven shaft 26 in one direction of rotation, but in the opposite direction runs free and unclutched, thus, when gears 27 are driven by reciprocating gear-racks 22, 23, 24, 25, said gears 27 will drive shaft 26 in one, uniform direction.

Any suitable means whereby gears 27 will be effective in only one direction may be employed. Preferably the rocker devices shown are used and these rocker ratchet devices are arranged as follows. On the driven shaft 26 there is fixed a body having an angular slot 28. In the bottom of said slot is radial bearing 29 for rocker 30. Each of said slots 28 of a series carries four rockers, one for each driving gear 27. Any suitable number of rockers may be used corresponding to the number of slots 28 in shaft 26. The outer face of each rocker 30 has a curvature of gradually increasing radius, so as to grip or clutch on the internal face of gears 27 in one direction of rotation and in the opposite direction release and slide idly thereover. Springs may be used to press said rockers against said gears 27. Swivel block 32 fits on crank-pin 16 and moves in slideway 20 on slide 18. Swivel block 33 on crank-pin 17 moves in slideway 21 on slide 19. There is provided a speed-changing mechanism whereby the stroke of slides 18 and 19 can gradually be changed from one of rest to full stroke, which is equal to the length of the internal pitch-diameter of said internal gear 8. Internal gears 8 and 9 have teeth cut on their external faces to mesh with worm 10 and are thus connected through and turned by worm 10 on shaft 11.

Any suitable means for turning internal gears 8 and 9 may be used. In this type of the invention a worm drive is employed whereby the internal gear 8 is turned in an opposite direction to internal gear 9, thus equalizing the resistance to movement of said internal gears 8 and 9. When crank-pins 16 and 17 are reciprocating in a center line, said slides 18 and 19 will reciprocate with full stroke. By turning the speed-changing shaft 11 and worm 10 internal gears 8 and 9 will turn, thereby changing the line of action of crank-pins 16 and 17. When the gears 8 and 9 are thus turned a quarter revolution from said position, or so that the lines of reciprocation of crank-pins 16 and 17 are 90° removed, said swivel-blocks 32 and 33 will reciprocate in cross-slides 20 and 21, bringing slides 18 and 19 to an actual stop.

The gear-racks 22 and 23 on slide 18 and 24, 25, on slide 19, in mesh with driving gear 27, rotating on driven shaft 26 are set and operate 90° apart and thus avoid a dead point in a continuous propulsive effort. The reciprocating motion of slides 18 and 19, previously described, is converted into a rotary motion which is continuous and uninterrupted. With a given speed of the driving-shaft 1 any desired speed of shaft 26 may be obtained by turning the speed-changing shaft 11.

What I claim is:

In a variable speed driving gear, the combination of a driving means, a driven part operated thereby, reciprocating means for transmitting the motion of the driving to the driven part, consisting of a crank-arm, a slide and crank pin, and means for changing the extent of reciprocation of said slide including a crank gear on the crank arm, a rotatable internal toothed gear meshing therewith and a device to rotate the internal gear so that the crank pin maintains a uniform extent of throw while the extent of reciprocating movement of said slide is varied.

BERTIL W. BRONANDER.

Witnesses:
 THOMAS J. F. KIRK,
 W. B. VANSIZE.